United States Patent [19]

Fong et al.

[11] Patent Number: 4,678,840
[45] Date of Patent: Jul. 7, 1987

[54] PHOSPHONIC ACID-CONTAINING POLYMER

[75] Inventors: Dodd W. Fong, Naperville; David J. Kowalski, LaGrange Park, both of Ill.

[73] Assignee: Nalco Chemical Company, Oak Brook, Ill.

[21] Appl. No.: 831,962

[22] Filed: Feb. 24, 1986

[51] Int. Cl.$^4$ ............................................. C08F 8/40
[52] U.S. Cl. ................................. 525/340; 525/329.4; 525/329.7; 525/329.9; 526/274; 526/278
[58] Field of Search ................ 525/340, 329.4, 329.7, 525/329.9; 526/274, 278

[56] References Cited

U.S. PATENT DOCUMENTS 3,573,093  3/1971  Oshibuchi et al. ................. 525/340

Primary Examiner—Harold D. Anderson
Attorney, Agent, or Firm—John G. Premo; Donald G. Epple; Anthony L. Cupoli

[57] ABSTRACT

A high temperature, pressurized process is described to synthesize phosphonated acrylamide polymers represented by the structure:

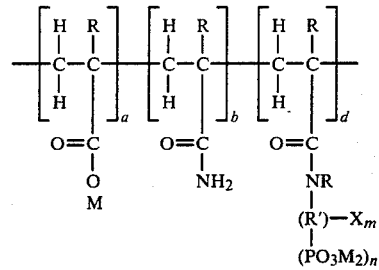

wherein X is from the group H, OR, Cl, Br, I, —COOM, —SO$_3$M,

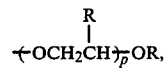

and mixtures thereof.

14 Claims, No Drawings

PHOSPHONIC ACID-CONTAINING POLYMER

INTRODUCTION

The synthesis of water-soluble phosphonated polymers has generally been limited. This synthesis of vinylic phosphonated polymers containing the phosphonate group has been limited from the point of view that only certain of these kinds of phosphonated monomers are commercially produced.

As a result, the use of these phosphonated water-soluble polymers is extremely limited commercially. It would therefore be an advance in the art if water-soluble polymeric chemical structures could be synthesized on a polymeric backbone which structures would contain the phosphonate group, either in the acid or salt form, and which structures might also contain other functional groups which could enhance the use of these water-soluble phosphonated polymers in certain applications such as dispersants in water treatment, scale inhibitors in natural and industrial waters, flocculants and coagulants, and the like.

It is therefore an object of this invention to create water-soluble polymers containing a phosphonate group and, in addition, which polymers may also contain other functional groups which may be useful when applied to aqueous solutions or environments.

It is another object of this invention to develop a synthetic procedure which can generally be applicable to the synthesis of various types of water-soluble polymers containing the phosphonate group with or without the additional presence of other functional groups which may be useful when these polymers are added to aqueous systems.

It is another object of this invention to synthesize and recover certain types of phosphonate containing water-soluble polymers which polymers may contain other functional groups such as hydroxyl, chloro, bromo, iodo, and/or mixtures thereof, which polymers have not heretofore been known or used.

THE INVENTION

We have discovered a process for modifying water-soluble polymers containing pendant amide functional groups, such polymers primarily derived from acrylamide containing vinylic polymers/copolymers or from alkyl substituted acrylamide containing vinylic polymers or copolymers, and which polymers/copolymers are water soluble and contain pendant amide functional groups derived from acrylamide, methyl acrylamide, ethylacrylamide, and the like.

The process which we have discovered is a process that uses the equivalent of a transamidation reaction with the pendant amide group on the polymer and a chemical reactant represented by the structure:

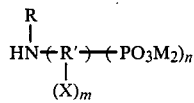

Formula I.

wherein
R' is a multi-valent hydrocarbonaceous bridging group which may be linear, branched, cyclic, aromatic, heterocyclic, and mixtures thereof, and having from 1-16 carbon atoms;

X is chosen from Cl, Br, I, OH, —COOM, —SO$_3$M, —OR,

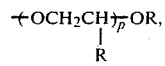

and mixtures thereof;
R is individually chosen, in each occurrence, from the group consisting of hydrogen and lower alkyl groups containing from 1-4 carbon atoms;
M is chosen from the group consisting of hydrogen, lower alkyl (C$_1$–C$_4$) groups, alkali metal, an equivalent amount of alkaline earth metals, alkyl and tertiary or quaternary amines and ammonium ions, and mixtures thereof;
and wherein,
p ranges between 1 and 16,
m ranges between 0 and 16,
n ranges between 1 and 16, provided that the sum of m+n is between 1-20.

THE CHEMICAL REACTANT

The chemical reactant described above is primarily an amino substituted compound which also contains the phosphonate functional group, and wherein the amine functional group contains at least one active hydrogen substituted on the amino nitrogen. Although phosphonate compounds having both primary and secondary amines can react under our transamidation reaction conditions to achieve modified phosphonate containing polymers, it is preferable that when a secondary amine is chosen to accomplish this modification of pendant amide containing polymers, that the alkyl group substituted on the amino nitrogen contain no more than 4 carbon atoms, i.e. the alkyl substitution should be limited to methyl, ethyl, propyl and butyl functionality, and isomers thereof.

However, it is most preferred that the amine substitution on the phosphonate containing chemical reactant be a primary amino functional group. When a primary amino functional group is used to accomplish the transamidation reaction, the reaction easily proceeds so as to incorporate at least 2, and preferably 60 mole percent of the chemical reactant used into the water-soluble polymer chain containing pendent amide groups.

In addition to the amine substitution in the chemical reactant described above, this chemical reactant does contain at least one phosphonate functional group in either its acid form, partial or complete ester form, or its salt form, wherein the salt form is chosen from a salt of an alkali metal, an alkaline earth metal, tertiary amines, quaternary amines, and ammonium ions, and mixtures thereof. The ester or salt forms may be in existence prior to the transamidation reaction or they may be synthesized by known techniques during the transamidation reaction or after the transamidation reaction has been completed.

In addition to the phosphonate functional group and the amine functional group, the chemical reactant may also contain other functional groups chosen from the groups consisting of chlorine, bromine, iodine, hydroxyl, ethoxyl, propoxyl, carboxyl, ester, ether, sulfonate groups and the like, and mixtures thereof. Preferably, the chemical reactant is limited to contain a primary amino group responsible for the transamidation reaction, at least one phosphonate group which allows the formation of an anionic phosphonate containing water-soluble polymer, and an hydroxyl, an ethoxylated or propoxylated group or a carboxylate functional group, the presence of which may enhance the activity of water-soluble phosphonate containing polymers synthesized by our process.

Most preferably, the chemical reactant contains a primary amine, zero or more carboxyl, hydroxyl, or ethoxylated groups, and one or more phosphonate groups either in the free acid form, ester forms, salt form, or mixtures thereof.

Several preferred species of the chemical reactant described above are demonstrated in the following formulations:

Formula II.

| | |
|---|---|
| $H_2N-CH_2-PO_3M_2$ | a. |
| $H_2N-CH_2CH-PO_3M_2$<br>$\quad\quad\quad\quad\;\;\;\mid$<br>$\quad\quad\quad\quad\;\;\;OH$ | b. |
| $H_2N-CH_2CH_2-PO_3M_2$ | c. |
| $H_2N-CH_2-CH-CH_2PO_3M_2$<br>$\quad\quad\quad\quad\quad\mid$<br>$\quad\quad\quad\quad\quad OH$ | d. | wherein, M is chosen from H, lower alkyl ($C_1$-$C_4$) groups, alkali metals, an equivalent amount of alkaline earth metals, and alkylated amine, ammonium, or quaternary nitrogen containing moieties.

THE PENDANT ACRYLAMIDE CONTAINING POLYMERS

The pendant acrylamide containing polymers are water-solube polymers which have a general structure allowing the presence of a pendant amide group as demonstrated in Formula III:

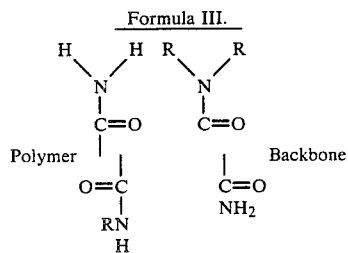

In Formula III, as one can observe, the pendant amide group may be a primary amide, a secondary amide, or a tertiary amide compound and mixtures thereof. Preferably, to obtain reasonable conversions of these pendant amide groups to the phosphonate containing functional groups described above, the pendant amide group is a primary amide group.

The most likely water-soluble polymers containing pendant amide functionality which polymers are easily modified under the conditions of our transamidation reaction, are those water-soluble polymers described by Formula IV:

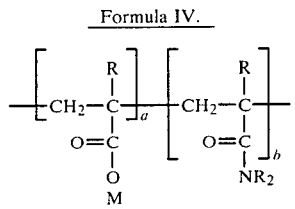

In Formula IV,

R is independently chosen, at each occurrence, from the group consisting of hydrogen, and lower alkyl groups containing from 1-4 carbon atoms;

M is independently chosen, at each occurrence, from hydrogen, lower alkyl ($C_1$-$C_4$) groups, alkali metals, an equivalent amount of alkaline earth metals and ammonium ions and mixtures thereof;

and a and b are integers having the following relationships:

a/b ranges between 0 to 100, and a+b is sufficient so as to provide a polymer having a molecular weight of at least 500. Preferably the sum a+b is sufficient to provide a molecular weight ranging between about 1,000–20,000,000.

As can be seen, the polymers described above may be homopolymers of acrylamide or its alkyl homologs, i.e. methacrylamide and the like, they may be copolymers of acrylamide with acrylic acid or its lower alkyl ($C_1$-$C_4$) esters, and their homologs such as methacrylic acid or methylacrylate and the like, or they may be terpolymers and above with other monomers of a vinylic nature which terpolymers contain acrylamide and acrylic acid or its esters, and their homologs such as methacrylic acid, methyl acrylate, metharcylamide, and the like.

THE CHEMICAL REACTION

The chemical reaction which is preferred to obtain the phosphonate polymers of this invention is a reaction which can generally be referred to as a transamidation reaction. This reaction substitutes an amine compound which may also contain other functional groups such as the phosphonate function group for the nitrogen portion of a pendant amide group contained on a polymeric backbone as described above. This transamidation reaction has been discovered to be a general reaction which can achieve the substitution of my amine and phosphonate containing moiety for the amide nitrogen group of the pendant amide functionality of a water-soluble polymer, thereby obtaining unique phosphonated polymers.

The reaction conditions require that polymers containing pendant amide groups be dissolved or readily dispersed in a solvent which is a common solvent for the chemical reactant of the class described above. In other words, both the polymer which is to be modified and the chemical reactant should be soluble or dispersible in the same solvent system.

Common solvents which have been found useful in this reaction include, but are not limited to, water, diglyme, dimethylformamide, dimethylsulfoxide, admixtures thereof, and admixtures of these solvents, either singly or taken together with other miscible solvents such as ethanol, tertiary butanol diglyme, and the like.

A preferred solvent which is a common solvent for both the polymer containing pendant amide groups and the chemical reactants above is water, particularly if the polymer containing pendant amide group is initially water-soluble, as in the case of most acrylamide containing vinylic polymers. Another preferred common solvent for our reaction is a water-in-oil emulsion wherein the dispersed water phase contains dissolved therein both the polymers containing pendant amide groups and the chemical reactants described above.

After having dissolved the polymers containing pendant amide groups in the common solvent, preferably water, the chemical reactant can be added to obtain a solution or dispersion of amide containing polymer and the chemical reactants of this invention. Whether the polymer or the reactant is first added to the common solvent is of no consequence. This admixture is then added to or contained in a reaction vessel capable of withstanding a pressurized chemical reaction, for example, a Parr Bomb type of vessel. The vessel is closed and then heated to a temperature of at least 100° C., preferably at least 110° C., and most preferably to a temperature of at least 120° C. If the temperature is increased above 100° C., the vessel contents can expand and the pressure within the vessel can exceed one atmosphere and depending upon the solvent, the phosphonates used or the reactants used, can reach up to about 5 to 15 atmospheres, and possibly more. The pressure within the reaction vessel is a non-controlled variable and is controlled only to the extent that the vessel is closed, that a reaction temperature of at least 100° C. or higher is reached, and the vessel may contain solvents or reactants of more or less volatile nature, which solvents and reactants have vapor pressures of such a nature that pressure vessels are required at temperatures above 100° C.

Once the reaction vessel contents have reached at least 100° C., and preferably 110° C., the reaction is allowed to occur for at least 3 minutes at this temperature, and preferably for whatever length of time is necessary to accomplish a minimum of at least a 2 percent, and preferably at least a 25 percent, conversion of the added amount of chemical reactant. The chemical reactant is, of course, converted to a pendant phosphonate containing substituted amide being the product of the transamidation chemical reaction summarized above. If the polymer is a homopolymer of acrylamide, methacrylamide, or a copolymer of vinyl amide containing monomers such that no other pendant functional group is present besides amide functional groups, the condition of the reaction is such that at least some degree of amide hydrolysis may also occur in those reactions in which water or a water containing solvent is utilized. In such cases, a carboxylate functional group is also obtained in addition to the phosphonate modified amide and any unreacted starting amide groups from the starting polymer.

Therefore, we have described the chemical reaction or process that accomplishes the synthesis of polymers having the structure:

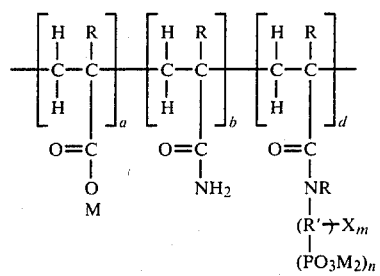

Formula V.

wherein
R' is a multi-covalent hydrocarbonaceous bridging group having from one to sixteen carbon atoms and being chosen from linear or branched alkyl, cyclic, aromatic, heterocyclic, and mixtures thereof, functional groups;
X is chosen from Cl, Br, I, OR, —SO$_3$M

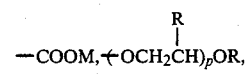

and mixtures thereof;
R is individually chosen at each occurrence from H and lower alkyl (C$_1$–C$_4$) groups;
M is chosen from hydrogen, lower alkyl (C$_1$–C$_4$) groups, alkali metal, an equivalent amount of alkaline earth metals, tertiary amines, quaternary amines, and ammonium ion and mixtures thereof;
and wherein
a, b, and d are integers with the following relationships:
a/b and a/d are from zero to 100
b/d is from 0.01 to 100
and the sum of a+b+d is sufficient to provide a molecular weight of at least 500,
and the ratio of d:(a+b) is from 100:1 to 1:100;
and wherein
p ranges between 1 and 16,
m ranges between 0 and 16,
n ranges between 1 and 16, provided that the sum of m+n is between 1–20;
which process comprises reacting, in a common solvent, at a temperature of at least 100° C.:
A. a polymer having a molecular weight of at least 500, and having pendant amide functional groups, which polymer is represented by the structure:

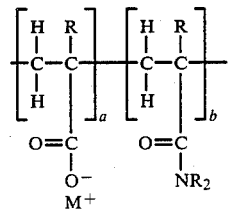

wherein R, M, a, b have the same meanings as above; with,
B. a chemical reactant having the structure:

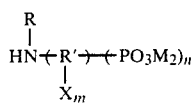

wherein R, R', M, X, m, and n have the meanings above; wherein the mole ratio of chemical reactant to pendant amide groups ranges between about 5:1 to about 1:100; and the reaction occurs for an effective amount of time to accomplish at least a 2 percent, and preferably at least a 25 percent, conversion of chemical reactant to water-soluble phosphonated polymer; and then recovering the water-soluble phosphonated polymer.

Polymer recovery may be accomplished in several ways known to the person familiar with the art. For example, the polymers may be precipitated by addition of precipitating solvents, or non-solvents, to the reaction mixture. For example, methanol or acetone may be added to the reaction mixture either as is or after concentration by distillation or vacuum distillation to precipitate the polymers. The polymers may also be recovered by vacuum distillation of solvent and unreacted chemical reactant from the reaction product mixture. The polymers may also be recovered by gel permeation chromatographic techniques, however, for the most part the polymers are recovered simply as a solution in the solvent used to perform the transamidation reaction, and used as such.

Preferably, our process is a method to synthesize water-soluble phosphonated polymers having randomly repeated mer units represented by the formula:

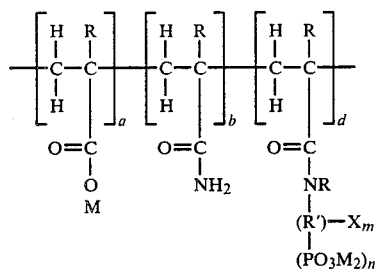

wherein
R' is a multi-covalent hydrocarbonaceous bridging group having from one to sixteen carbon atoms and being chosen from linear alkyl, branched alkyl, cyclic, aromatic, heterocyclic, and mixtures thereof, functional groups; X is chosen from —COOM,

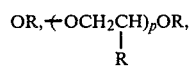

and mixtures thereof;
R is individually chosen at each occurrence from H and lower alkyl ($C_1$-$C_4$) groups;
M is chosen from hydrogen, lower alkyl ($C_1$-$C_4$) groups, alkali metal, ½ alkaline earth metal, tertiary amines, quaternary amines, and ammonium ions and mixtures thereof;
and wherein
a, b, and d are integers with the following relationships:
a/b is from zero to 100,
b/d is from 0.01 to 100,
a/d is from zero to 100,
and the sum of a+b+d is sufficient to provide a molecular weight of at least 3,000,
and the ratio of d:(a+b) is from 20:1 to 1:100;
and wherein
p ranges from 1 and 16,
m ranges between 0 and 16,
n ranges between 1 and 16, provided that when m is zero,
the sum of m+n is from 1 to 20;
which process comprises reacting, in a common solvent, at a temperature of at least 100° C.:

A. a polymer having a molecular weight of at least 500, and having pendant amide functional groups, and represented by the structure:

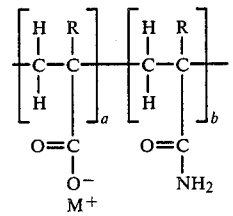

wherein R, M, a, b have the same meanings as above; with

B. a chemical reactant having the structure:

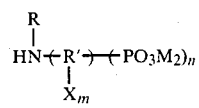

wherein R, R', M, X, p, m, and n have the meanings above; and wherein the mole ratio of chemical reactant to pendant amide groups ranges between about 5:1 to about 1:100; and wherein the reaction occurs for an effective amount of time to accomplish at least a 25–60 percent conversion of chemical reactant to water-soluble phosphonated polymer; and then recovering the water-soluble phosphonated polymer.

Most preferably, our process is a method for the synthesis of water-soluble phosphonated polymers represented by the formula:

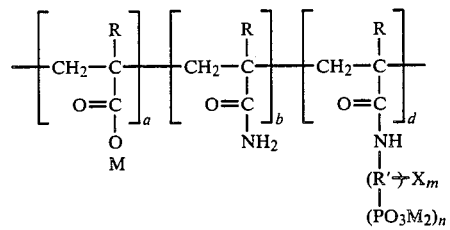

wherein
R' is chosen from multi-covalent, branched alkyl, linear alkyl or cyclic hydrocarbonaceous bridging groups having from one to eight carbon atoms;
X is chosen from —COOM, ($OCH_2CH_2$)OR, OH, and mixtures thereof;
R is individually chosen at each occurrence from hydrogen and $C_1$ to $C_4$ lower alkyl groups;

M is individually chosen at each occurrence from hydrogen, lower alkyl ($C_1$–$C_4$) groups, alkali metals, and ammonium ions, m ranges between 0 to 6;

n ranges between 1 to 4;

a, b, and d are integers with the following relationships:
a/b ranges from 0 to 100,
a/d ranges from 0 to 100,
b/d ranges from 0.01 to 100, and the ratio d:(a+b) is between about 5:1 to about 1:25, and wherein the occurrence of mer units of a, b, and d is random and the sum of a+b+d will achieve a molecular weight of at least 1000; which process comprises reacting, in an aqueous solvent:

A. a polymer having pendant amide functional groups and represented by the structure:

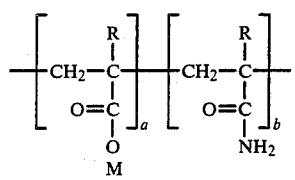

wherein
R, M, a, and b have the meanings above and wherein the sum of a+b achieves a molecular weight of at least 500; and B. a chemical reactant having the structure:

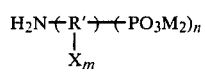

wherein R', M, X, m, and n have the meanings above; under the following reaction conditions:

I. a reaction temperature of at least 100° C. and preferably at least 110° C.;

II. a reaction time of at least ¼ hour and preferably at least ½ hour;

III. a mole ratio of chemical reactant to polymer ranging between about 2:1 to about 1:50;

IV. a pressure ranging from atmospheric pressure to 35 times atmospheric pressure, or more;

thereby achieving the synthesis of the phosphonated polymers described above.

It is particularly of interest that our synthetic procedures permit the synthesis of a phosphonated polymer represented by:

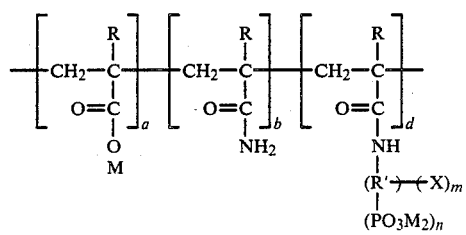

wherein:
R' is a linear or branched alkylene bridging group having from 1 to 6 carbon atoms;
X is chosen from —OH, —COOM, and

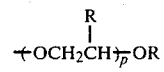

and mixtures thereof;

R is individually chosen, at each occurrence, from the group hydrogen, methyl and ethyl groups;

M is individually chosen, at each occurrence, from the group hydrogen, lower alkyl ($C_1$–$C_4$) groups, sodium, potassium, ammonium ions and mixtures thereof;

p is from 1 to 12;

m is from 0 to 3;

n is from 1 to 3; and a, b, and d are integers having the relationships:
a/d is from 0 to 50,
a/b is from 0 to 50,
b/d is from 0.1 to 20,
d:(a+b) is from 5:1 to 1:10, the sum of a+b+d is sufficient to provide a molecular weight of at least 1,000; which process comprises the reaction, in an aqueous solvent, for at least ¼ hour at a temperature of at least 110° C., in a pressure controlling reactor, of the ingredients:

A. a reactant:

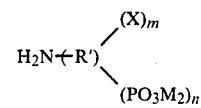

wherein X is from the group —OH, —COOM,

and mixtures thereof, and
wherein R', M, p, m and n have the above meanings; and B. a water-soluble vinyl polymer having pendant amide groups represented by:

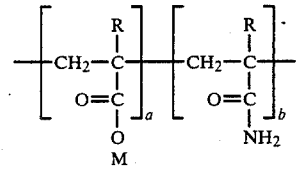

wherein R, M, a, and b have the above meanings; and wherein the mole ratio of reactant to pendant amide groups ranges between about 1:1 to about 1:5; and then recovering the phosphonated polymer.

To further illustrate our invention, we provide the following examples.

EXAMPLE I

A solution of poly(acrylic acid [25 mole %]: acrylamide [75 mole %]) (27.5% actives, 37.2 g), 3-aminopropyl phosphonic acid (4 g), sodium hydroxide (50% solution, 2.3 g.) was heated to 150° C. for five hours. The product was characterized by L.C. and C13, P31 NMR methods. The molecular weight of the polymer was found to be 11,100. NMR analysis of the sample showed that the polymer contained 8 mole % N-3-phosphonopropyl acrylamide.

In addition, the following polymers would be expected to be synthesized if acrylamide containing polymers were reacted according to the procedures described above with the following chemical reactants. The anticipated products are described in Table I.

TABLE I

| Starting Polymer | Starting Chemical Reactant | Anticipated Product Polymer |
|---|---|---|
| T⫫CH₂—CH⫫ₐT<br>  \|<br>  O=C<br>  \|<br>  NH₂<br>T = any terminal group | H₂N—CH₂CH₂PO₃Na₂ | ⫫CH₂—CH⫫ₐ⫫CH₂—CH⫫ᵦ⫫CH₂—CH⫫ₐ<br>      \|                \|                \|<br>      O=C          O=C          O=C<br>      \|                \|                \|<br>      O              NH₂           NH<br>      \|                              \|<br>      M                             CH₂<br>                                     \|<br>                                     CH₂<br>                                     \|<br>                                     PO₃⁻<br>                                     2Na⁺ |
| " | H₂N—CH₂CH CH CHCH₂PO₃H₂<br>         \|    \|    \|<br>         OH OH OH | ⫫AA⫫ₐ⫫AcAm⫫ᵦ⫫CH₂—CH⫫ₐ<br>                          \|<br>                          O=C<br>                          \|<br>                OH OH OH NH<br>                 \|    \|    \|    \|<br>H₂O₃PCH₂—CH—CH—CH—CH₂ |
| " | Cl<br>                    \|<br>H₂N—CH₂—CH—CH₂—CH₂<br>                              \|<br>                              PO₃H₂ | ⫫AA⫫ₐ⫫AcAm⫫ᵦ⫫CH₂—CH⫫ₐ<br>                          \|<br>                          C=O<br>                          \|<br>                Cl       NH<br>                 \|         \|<br>H₂O₃P—CH₂—CH₂—CH—CH₂ |
| " | H₂N—⬡—PO₃H₂<br>           \|<br>           OH | ⫫AA⫫ₐ⫫AcAm⫫ᵦ⫫CH₂—CH⫫ₐ<br>                          \|<br>                          O=C<br>                          \|<br>                          NH<br>                          \|<br>                          ⬡—OH<br>                          \|<br>                          PO₃H₂ |
| ⫫AA⫫ₐ⫫AcAm⫫ᵦ | OH Cl<br>         \|    \|<br>HN—CH₂CH CHCH₂PO₃H₂<br>\|<br>CH₃ | ⫫AA⫫ₐ⫫AcAm⫫ᵦ⫫CH₂—CH⫫ₐ<br>                          \|<br>                          O=C<br>                          \|<br>                Cl  OH  N—CH₃<br>                 \|    \|    \|<br>H₂O₃P—CH₂CH—CH—CH₂ |
| ⫫AA⫫ₐ⫫AcAm⫫ᵦ | CH₂PO₃H₂<br>       /<br>  HN       O<br>       \<br>       CH₂PO₃H₂ | ⫫AA⫫ₐ⫫AcAm⫫ᵦ⫫CH₂—CH⫫ₐ<br>                          \|<br>                          O=C<br>                          \|<br>                          N<br>                         / \<br>            H₂O₃PCH₂   CH₂PO₃H₂<br>                    \  O  / |
| ⫫AcAm⫫ᵦ | H₂N—⬡—CH₂PO₃H₂ | ⫫AA⫫ₐ⫫AcAm⫫ᵦ⫫CH₂—CH⫫ₐ<br>                          \|<br>                          O=C<br>                          \|<br>                          NH<br>                          \|<br>                          ⬡<br>                          \|<br>                          CH₂<br>                          \|<br>                          PO₃H₂ |

TABLE I-continued

| Starting Polymer | Starting Chemical Reactant | Anticipated Product Polymer |
|---|---|---|
| ⫞AcAm⫟$_b$ | H$_2$N—CH$_2$—⟨C$_6$H$_4$⟩—PO$_3$H$_2$ | [AA⫟$_a$⫞AcAm⫟$_b$⫞CH$_2$—CH⫟$_d$<br>C=O<br>\|<br>NH—CH$_2$—⟨C$_6$H$_4$⟩—PO$_3$H$_2$ (H$_2$O$_3$P on ring) |
| ⫞AcAm⫟$_b$ | H$_2$N—CH$_2$—CH(OH)—CH$_2$PO$_3$(CH$_3$)$_2$ | ⫞AA⫟$_a$⫞AcAm⫟$_b$⫞CH$_2$CH⫟$_d$<br>C=O<br>\|<br>NH<br>\|<br>CH$_2$<br>\|<br>HC—OH<br>\|<br>CH$_2$<br>\|<br>PO$_3$(CH$_3$)$_2$ |
| ⫞AcAm⫟$_b$ | H$_2$N—CH$_2$—CH$_2$—CH$_2$N(CH$_2$PO$_3$H$_2$)$_2$ | ⫞AA⫟$_a$⫞AcAm⫟$_b$⫞CH$_2$CH⫟$_d$<br>C=O<br>\|<br>NH<br>\|<br>CH$_2$<br>\|<br>CH$_2$<br>\|<br>CH$_2$<br>\|<br>N(CH$_2$PO$_3$H$_2$)$_2$ |
| ⫞CH$_2$—CH⫟$_x$⫞AcAm⫟$_b$<br>O=C<br>\|<br>O<br>\|<br>CH$_3$ | H$_2$N—CH$_2$CH$_2$PO$_3$H$_2$ | ⫞CH$_2$—CH⫟$_x$⫞AA⫟$_a$⫞AcAm⫟$_b$⫞CH$_2$—CH⫟$_d$<br>O=C     C=O<br>\|         \|<br>O       NH<br>\|         \|<br>CH$_3$   (CH$_2$)$_2$<br>           PO$_3$H$_2$ |
| ⫞AcAm⫟ | H$_2$N—CH$_2$—PO$_3$H$_2$ | [AA⫟$_a$⫞AcAm⫟$_b$⫞CH$_2$—CH⫟$_d$<br>C=O<br>\|<br>H$_2$O$_3$P—CH$_2$—NH |
| ⫞CH$_2$—CH⫟$_a$⫞CH$_2$—CH⫟$_b$<br>\|            \|<br>CO$_2$H   C=O<br>         \|<br>         NH$_2$ | CO$_2$H<br>\|<br>H$_2$N—CH$_2$—CH—CH$_2$—PO$_3$H$_2$ | [AA⫟$_a$⫞AcAm⫟$_b$⫞CH$_2$—CH⫟$_d$<br>C=O<br>\|<br>NH<br>\|<br>CH$_2$—CH—CH$_2$<br>\|          \|<br>PO$_3$H$_2$   CO$_2$H |
| ⫞AcAm⫟$_b$ | H—N(CH$_2$CH$_2$PO$_3$H$_2$)(CH$_2$CH$_2$CO$_2$H) | [AA⫟$_a$⫞AcAm⫟$_b$⫞CH$_2$—CH⫟$_d$<br>C=O<br>\|<br>H$_2$O$_3$P—CH$_2$CH$_2$—NCH$_2$CH$_2$CO$_2$H |
| ⫞AcAm⫟$_b$ | OH<br>\|<br>CH$_2$CHCH$_2$PO$_3$H$_2$<br>\|<br>H—N<br>\|<br>CH$_2$CHCH$_2$PO$_3$H$_2$<br>\|<br>OH | [AA⫟$_a$⫞AcAm⫟$_b$⫞CH$_2$CH⫟$_d$<br>C=O<br>\|<br>N<br>╱ ╲<br>CH$_2$   CH$_2$<br>\|       \|<br>HOCH   HCOH<br>\|       \|<br>CH$_2$    CH$_2$<br>\|       \|<br>PO$_3$H$_2$   PO$_3$H$_2$ |

TABLE I-continued

| Starting Polymer | Starting Chemical Reactant | Anticipated Product Polymer |
|---|---|---|
| ~(AA)$_a$~(AcAm)$_b$~ | H$_2$NCH$_2$—CH(OH)—CH$_2$PO$_3$H$_2$ | ~(AA)$_a$~(CH$_2$—CH)$_d$~ with pendant C=O, NH, CH$_2$, HC—OH, CH$_2$PO$_3$H$_2$ |
| ~(AcAm)$_b$~ | HNCH$_2$CHCH$_2$PO$_3$(CH$_3$)H with CH$_3$, O, CH$_2$, CH$_2$, O$_3$, H | ~(AA)$_a$~(CH$_2$—CH)$_b$~(CH$_2$—CH)$_d$~ with O=C—NH$_2$ and O=C—N(CH$_3$)—CH$_2$—H(OCH$_2$CH$_2$)$_3$O—CH—CH$_2$PO$_3$(CH$_3$)H | wherein [AA] = acrylic acid
[AcAm] = acrylamide
a, b, d, R, M, have meanings as described about Having described our invention, we claim:

1. A process to synthesize water-soluble phosphonated polymer having randomly repeated mer units represented by the formula:

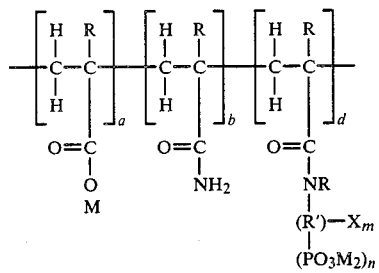

wherein
R' is a multi-covalent hydrocarbonaceous bridging group having from one to sixteen carbon atoms and being chosen from bridging groups which are linear alkyl, branched alkyl, cyclic, alkaryl, arylalkyl, aromatic, heterocyclic, olefinic or mixtures thereof;
X is chosen from Cl, Br, I, —COOM, —SO$_3$M, —OR,

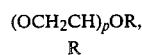

or mixtures thereof;
R is individually chosen at each occurrence from H or lower alkyl (C$_1$-C$_4$) groups;
M is chosen from hydrogen, lower alkyl (C$_1$-C$_4$) groups, alkali metal, an equivalent amount of alkaline earth metals, tertiary amines, quaternary amines, ammonium ion, or mixtures thereof;
and wherein,
a, b, and d are integers with the following relationships;
a/b is from zero to 100
b/d is from 0.01 to 100
a/d is from zero to 100,
and the sum of a+b+d is sufficient to provide a weight average molecular weight of at least 500,
and the ratio of d:(a+b) is from 100:1 to 1:100;
and wherein
p ranges between 1 and 16,
m ranges between 0 and 16, and
n ranges between 1 and 16, provided that when m is zero,
the sum of m+n is from 1 to 20;
which process comprises reacting, in a common solvent, at a temperature of at least 100° C.;

A. a polymer having a weight average molecular weight of at least 500, and having pendant amide functional groups, and represented by the structure:

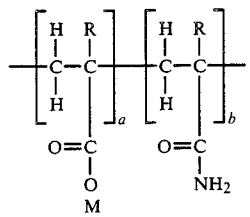

wherein R, M, a, b have the same meanings as above; with

B. a chemical reactant having the structure:

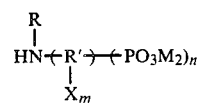

wherein R, R', M, X, m, and n have the meanings above; and wherein the mole ratio of chemical reactant to pendant amide groups in the polymer ranges between about 5:1 to about 1:100; and reacting for an effective amount of time to accomplish at least a 25 percent conversion of chemical reactant to phosphonated pendant groups on the polymer; and then recovering the water-soluble phosphonated polymer.

2. The process of claim 1 wherein:
R' has at least two carbon atoms and is linear, cyclic, aromatic or mixtures thereof;
X is OH, COOH,

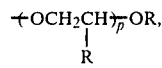

or mixtures thereof;
R is individually chosen at each occurrence from hydrogen, methyl, or ethyl groups,
M is individually chosen at each occurrence from hydrogen, lower alkyl ($C_1$–$C_4$) groups, sodium, potassium, tertiary amines, quaternary amines, ammonium or mixtures thereof,
p is from 1 to 12;
m is from 0 to 4;
n is from 1 to 4;
and the weight average molecular weight of the water-soluble phosphonated polymer ranges between about 2000 to about 20,000,000.

3. The process of claim 1 or 2 wherein the common solvent is from the group consisting of water, dimethylformamide, dimethylsulfoxide, diglyme, and mixtures thereof.

4. The process of claim 1 or 2 wherein the solvent is from the group water and water-emulsified in a continuous oil phase such that the water-soluble phosphonated polymer is recovered either as a water-in-oil emulsion or as an aqueous solution.

5. The synthesis of water-soluble phosphonated polymer represented by the formula:

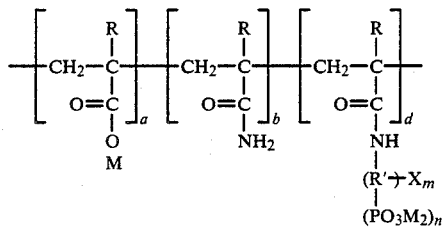

wherein
R' is chosen from multi-covalent, branched alkyl, linear alkyl or cyclic hydrocarbonaceous bridging groups having from one to eight carbon atoms;
X is chosen from OH, —COOM, (OCH$_2$CH$_2$)$_p$OR, —SO$_3$M, or mixtures thereof;
R is individually chosen at each occurrence from hydrogen or $C_1$ to $C_4$ lower alkyl,
M is individually chosen at each occurrence from hydrogen, lower alkyl ($C_1$–$C_4$) groups, alkali metals, tertiary amines, quaternary amines, or ammonium ions,
p ranges from 1 to 12;
m ranges between 0 to 6;
n ranges between 1 to 4;
a, b, and d are integers with the following relationships:
a/b ranges from 0 to 100,
a/d ranges from 0 to 100,
b/d ranges from 0.01 to 100, and
the ratio d:(a+b) is between about 5:1 to about 1:25, and wherein the occurrence of mer units of a, b, and d is random and the sum of a+b+d will achieve a weight average molecular weight of at least 1,000; which process comprises reacting, in an aqueous solvent:

A. a polymer having pendant amide functional groups and represented by the structure:

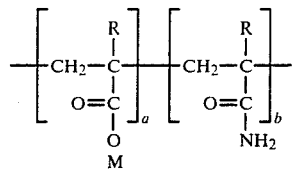

wherein
R, M, a, and b have the meanings above and wherein the sum of a+b achieves a weight average molecular weight of at least 500; and B. a reactant having the structure:

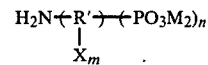

wherein R', M, X, m, and n have the meanings above;
under the following reaction conditions:
I. a reaction temperature of at least 100° C.;
II. a reaction time of at least ¼ hour;
III. a mole ratio of chemical reactant to polymer ranging between about 2:1 to about 1:50;
IV. a pressure ranging from atmospheric pressure to 35 times atmospheric pressure;
thereby achieving and thereafter recovering said phosphonated polymers.

6. The process of claim 5,
wherein
R' is a linear alkylene bridging group having from 2 to 6 carbon atoms;
X is from the group OH, COOH, (OCH$_2$CH$_2$)$_p$OH or mixtures thereof;
R is individually chosen at each ocurrence from hydrogen or methyl;
M is individually chosen at each occurrence from hydrogen, lower alkyl ($C_1$–$C_4$) groups, sodium, potassium, ammonium, or mixtures thereof;
a, b and d are integers having the following relationships:
a/b ranges from 0 to 50,
a/d ranges from 0 to 50,
b/d ranges from 0.01 to 10, and
d:(a+b) ranges between about 4:1 and 1:20,
nd the sum of a+b+d is such that the phosphonated polymer has a weight average molecular weight ranging from 1,000–20,000,000, and which process comprises reacting at a temperature of at least 110° C. for at least ¼ hour, in a common aqueous solvent,
A. a polymer having the structure:

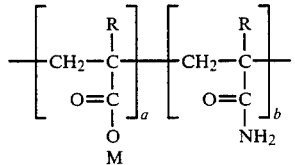

wherein R, M, a, and b have the meanings above and wherein the sum of a+b is such that the weight average molecular weight of the polymer is at least 2,000; with B. a chemical reactant having the structure:

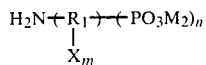

wherein
$R_1$, M, and X are defined above, and
m is from 0 to 3,
n is from 1 to 3, and the sum of m+n is from 1 to 4; and, the ratio of reactant to polymer ranges between about 1:1 to about 1:10, and the reaction pressure is at least 1.25 atmospheres; and then recovering said phosphonated polymer.

7. The process of claim 5 or 6 wherein the solvent is water or a water-in-oil emulsion.

8. A process for synthesizing a phosphonated polymer represented by:

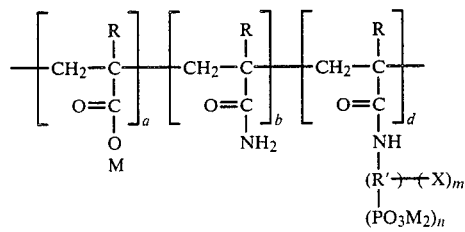

wherein:
R' is a linear or branched alkylene bridging group having from 1 to 6 carbon atoms;
X is from —OH, —COOH, or mixtures thereof;
R is individually chosen, at each occurrence, from the group hydrogen, methyl or ethyl groups;
M is individually chosen, at each occurrence, from the group hydrogen, lower alkyl ($C_1$-$C_4$) groups, sodium, potassium, tertiary amines, quaternary amines, ammonium ions, or mixtures thereof
m is from 0 to 3;
n is from 1 to 3; and the sum, n+m, is from 1-4;
a, b, and d are integers having the relationships:
a/d is from 0 to 50,
a/b is from 0 to 50,
b/d is from 0.1 to 20,
d:(a+b) is from 5:1 to 1:10,
the sum of a+b+d is sufficient to provide a weight average molecular weight of at least 2,000; which process comprises reacting in an aqueous solvent, for at least ½ hour at a temperature of at least 110° C., in a pressure controlling reactor, the ingredients:

A. a chemical reactant:

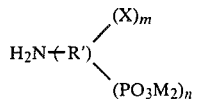

wherein R', X, M, m and n have the above meanings; and

B. a water-soluble vinyl polymer having pendant amide groups represented by:

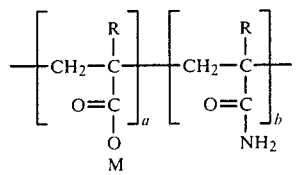

wherein R, M, a, and b have the above meanings; and wherein the mole ratio of reactant to pendant amide groups on the polymer ranges between about 1:1 to about 1:5; and then recovering the phosphonated polymer.

9. The phosphonated polymer:

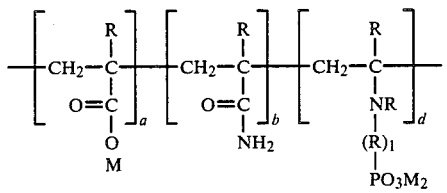

which is synthesized, in a pressure controlling reactor, by reacting a precursor polymer:

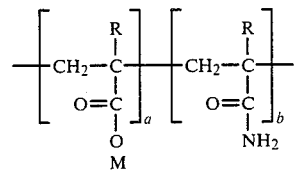

with a chemical reactant:

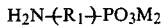

in an aqueous reaction solvent at a temperature of at least 100° C. for at least ¼ hour at a mole ratio of precursor polymer to chemical reactant ranging between about 20:1 to about 1:2, and wherein:
$R_1$ is a lower linear or branched alkylene bridging group containing form 1 to 6 carbon atoms;
R is chosen individually, at each occurrence, from hydrogen or methyl groups;
M is chosen individually, at each occurrence, from hydrogen, lower alkyl ($C_1$-$C_4$) groups, alkali metal, tertiary amines, quaternary amines, ammonium ions, or mixtures thereof;
a, b, and d are integers having the relationships:
a/d is from 0 to 100,
a/b is from 0 to 100,
b/d is from 0.01 to 100, and
d:(a+b) ranges between about 10:1 to about 1:100, and wherein the sum, a+b+d, is such that the phosphonated polymer has a weight average molecular weight of at least 1000.

10. The phosphonated polymer of claim 9 which is synthesized in an aqueous reaction solvent at a temperature of at least 120° C. for at least 1 hour at a mole ratio of precursor polymer to chemical reactant of from 10:1 to 1:1 and wherein:
R is hydrogen, M is from the group H, sodium, potassium, ammonium ions, or mixtures thereof, and the polymer has a weight average molecular weight between about 2000 to about 20,000,000.

11. The phosphonated polymer represented by the structure:

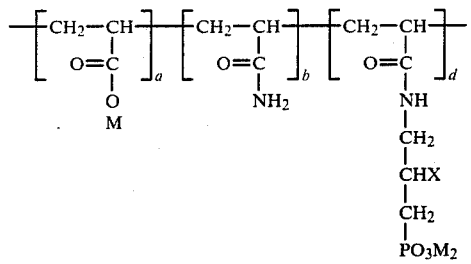

wherein M is individually chosen, at each occurrence, from hydrogen, sodium or ammonium ions;

X is from the group —OH, —COOH, $-(OCH_2CH_2)_p OH$, —SO$_3$, or mixtures thereof;

p is from 1 to 6;

a, b, d are integers such that:
the sum of a+b+d is sufficient to achieve a weight average molecular weight of at least 1000;

a/d is from 0 to 100;

b/d is from 0.01 to 100;

a/b is from 0 to 100, and the ratio d:(a+b) ranges between about 5:1 to 1:50.

12. The phosphonated polymer represented by:

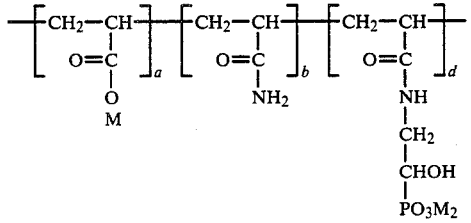

and wherein M, a, b, d have the meanings of claim 11.

13. The phosphonated polymer represented by the structure:

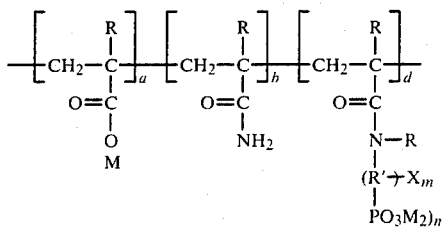

wherein

R' is a multivalent hydrocarbonaceous bridging group having from 1-6 carbon atoms and being from linear alkyl, branched alkyl, cyclic, olefinic groups, or mixtures thereof;

X is from —OH, —COOM, or mixtures thereof;

R is individually chosen, at each occurrence, from hydrogen or methyl groups;

M is individually chosen, at each occurrence, from hydrogen, lower alkyl ($C_1$-$C_4$) groups, sodium, potassium, ammonium ions, or mixtures thereof;

wherein a, b, and d are integers, the sum of which is such that the weight average molecular weight of the phosphonated polymer is at least 2,000, and wherein the following relationships exist:

a/b is from 0 to 100, a/d is from 0 to 100, b/d is from 0.01 to 1000, and the ratio d:(a+b) is between about 10:1 to about 1:100, and wherein:

m is equal to 0 to 6, n is equal to 1 to 6, and the sum of m+n is between 1-6.

14. The phosphonated polymer represented by the structure:

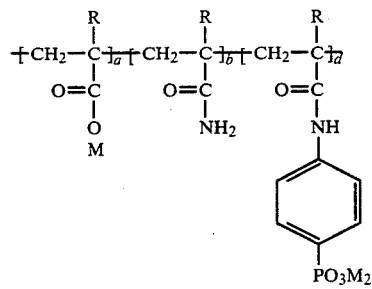

wherein R is individually chosen, at each occurrence, from hydrogen or methyl groups;

M is individually chosen, at each occurrence, from hydrogen, a methyl group, sodium, potassium, ammonium ions, or mixtures thereof; and, a, b, and d are the same as in claim 13.

* * * * *